United States Patent
Oya et al.

(10) Patent No.: US 9,606,139 B2
(45) Date of Patent: Mar. 28, 2017

(54) SHOCK DETECTION SYSTEM AND SHOCK DETECTION METHOD WITH VEHICLE AT REST

(71) Applicant: TOYOTA JIDOSHA KABUSHIKI KAISHA, Toyota-shi, Aichi-ken (JP)

(72) Inventors: Ryosuke Oya, Toyota (JP); Mitsuhiro Nada, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/882,602

(22) Filed: Oct. 14, 2015

(65) Prior Publication Data
US 2016/0107630 A1    Apr. 21, 2016

(30) Foreign Application Priority Data
Oct. 17, 2014 (JP) ................. 2014-212225

(51) Int. Cl.
| | |
|---|---|
| *B60T 17/22* | (2006.01) |
| *G01P 3/00* | (2006.01) |
| *G01P 15/00* | (2006.01) |
| *B60T 1/06* | (2006.01) |
| *G01P 3/44* | (2006.01) |
| *B60T 7/22* | (2006.01) |

(52) U.S. Cl.
CPC ............. *G01P 15/00* (2013.01); *B60T 1/062* (2013.01); *B60T 7/22* (2013.01); *B60T 17/22* (2013.01); *G01P 3/00* (2013.01); *G01P 3/44* (2013.01); *B60T 2201/024* (2013.01)

(58) Field of Classification Search
CPC . B60T 17/22; B60T 1/062; B60T 7/22; B60T 2201/024; G01S 13/93
USPC ................................................ 701/33.9, 301
See application file for complete search history.

(56) References Cited

U.S. PATENT DOCUMENTS

| | | | | |
|---|---|---|---|---|
| 9,174,551 | B2* | 11/2015 | Nagamori | B60L 3/0023 |
| 2012/0041661 | A1* | 2/2012 | Kaneko | B60T 1/062 |
| | | | | 701/70 |
| 2015/0175032 | A1* | 6/2015 | Nagamori | B60L 3/0023 |
| | | | | 701/22 |
| 2015/0303858 | A1* | 10/2015 | Katsumata et al. | B60L 15/20 |
| | | | | 318/139 |

FOREIGN PATENT DOCUMENTS

| | | |
|---|---|---|
| JP | 2003-81074 | 3/2003 |
| JP | 2007-205578 | 8/2007 |
| JP | 2008-157361 | 7/2008 |
| JP | 2012-81933 | 4/2012 |

* cited by examiner

*Primary Examiner* — Tyler J Lee
(74) *Attorney, Agent, or Firm* — Finnegan, Henderson, Farabow, Garrett & Dunner, LLP

(57) ABSTRACT

A shock detection system with a vehicle at rest includes a parking mechanism for locking rotation of a drive shaft which rotates a wheel of the vehicle, a revolution sensor for detecting a revolution speed of the drive shaft, and a shock detector for detecting a shock to the vehicle based on a magnitude and a frequency of variation in detection values of the revolution speed of the drive shaft detected by the revolution sensor in a state where the rotation of the drive shaft is locked by the parking mechanism.

10 Claims, 1 Drawing Sheet

SHOCK DETECTION SYSTEM AND SHOCK DETECTION METHOD WITH VEHICLE AT REST

CROSS-REFERENCE TO RELATED APPLICATIONS

This application claims priority based on Japanese Patent Application No. 2014-212225 filed on Oct. 17, 2014, the entire disclosure of which is hereby incorporated by reference.

BACKGROUND

Technical Field

The present invention relates to shock detection with a vehicle at rest.

Related Art

In general, as a method of detecting a shock applied to a vehicle, there may be applied a method of mounting on the vehicle an acceleration sensor or a tactile sensor as a shock sensor. For example, JP2003-81074A discloses a method in which, when an acceleration detected by an acceleration sensor is higher than a preset threshold value, a shock applied to a vehicle is detected, and a brake mechanism is driven to control a braking force.

Here, in a fuel cell vehicle that uses, as energy, electric power generated by a fuel cell to drive a motor and travel, even when the vehicle is stopped and an ignition switch is off, the operation of the fuel cell system may be continued to perform processing (hereinafter referred to as "system stop processing") such as a scavenging operation on the fuel cell. While the operation of the fuel cell system is continued for the scavenging processing, high-voltage power is continuously supplied to the fuel cell system, and a reaction gas is continuously supplied to the fuel cell. Hence, while the operation of the fuel cell system is continued, when a shock is applied to the vehicle by, for example, collision of another vehicle, it is preferable to detect the shock and take various measures such as interruption of the supply of the high-voltage power or interruption of the supply of the reaction gases.

However, since an acceleration sensor provided in a conventional general vehicle is used to detect a shock to the vehicle to operate a protective device such as a seat belt or an air bag, the acceleration sensor is not operated after an ignition switch is turned off. Hence, in order to detect a shock to the vehicle while the fuel cell system in the fuel cell vehicle is continuously operated to perform the system stop processing described above, it would be disadvantageously necessary to simply and newly mount a sensor, such as an acceleration sensor, for shock detection.

JP2003-81074A teaches that in a conventional vehicle, a shock is detected by an acceleration sensor and a brake mechanism is driven to control a braking force, but does not teach at all the detection of a shock when the acceleration sensor is not operated.

SUMMARY

The present invention is made to solve at least part of the problem described above and can be realized as aspects below.

(1) According to a first aspect, there is provided a shock detection. system with a vehicle at rest. The shock detection system includes: a parking mechanism for locking rotation of a drive shaft which rotates a wheel of the vehicle; a revolution sensor for detecting a revolution speed of the drive shaft; and a shock detector for detecting a shock to the vehicle based on a magnitude and a frequency of variation in detection values of the revolution speed of the drive shaft detected by the revolution sensor in a state where the rotation of the drive shaft is locked by the parking mechanism.

In the shock detection system described above, it is possible to detect a shock to the vehicle with the vehicle at rest based on the magnitude and the frequency of variation in the revolution speed of the drive shaft, detected by the revolution sensor in a state where the parking mechanism is locked. Since in general, the parking mechanism and the revolution sensor are normally on-board a vehicle, as described in the discussion of the problem, it is possible to detect a shock to the vehicle without newly adding a sensor for detection of a shock such as an acceleration sensor while utilizing the normal onboard devices.

(2) In the above shock detection system, the shock detector may determine whether or not a shock is applied to the vehicle based on a occurrence frequency at which the revolution speed of the drive shaft becomes equal to or more than a predetermined revolution-speed threshold value.

In this way, if a small force whose magnitude is not enough to be detected as a shock is applied to the vehicle, it is possible to prevent such a force from being detected as a shock.

(3) in the above shock detection system, the shock detector may determine that a shock is applied to the vehicle if a detection value of the revolution speed of the drive shaft equal to or more than the predetermined revolution-speed threshold value is obtained a number of times equal to or more than a predetermined number-of-times threshold value within a predetermined time. In this way, oscillatory variations in the revolution speed occurring due to a force which is applied to the vehicle accidentally or on a daily basis and whose magnitude is not enough to he detected as a shock are distinguished from oscillatory variations in the revolution speed occurring due to shock to be detected, and thus it is possible to determine whether or not a shock to be detected is applied. Thus, whether or not a shock is applied to the vehicle is determined based on the occurrence frequency at which the revolution speed is equal to or more than the predetermined revolution-speed threshold value.

(4) In the above shock detection system, the shock detector may determine that a shock is applied to the vehicle if a time interval between a first peak value and a subsequent peak value of the detection values of the revolution speed of the drive shaft that are equal to or more than the predetermined revolution-speed threshold value becomes equal to or less than a predetermined interval threshold value.

In this way, it is thus possible to determine that a shock to be detected is applied when the occurrence frequency at which the revolution speed is equal to or more than the revolution-speed threshold value appears is high. Thus, whether or not a shock is applied to the vehicle is determined based on the occurrence frequency at which the revolution speed is equal to or more than the predetermined revolution-speed threshold value.

(5) In the above shock detection system, the vehicle may be a fuel cell vehicle that uses, as energy, electric power generated by a fuel cell to drive a motor and travel.

As described in the discussion of the problem, in the fuel cell vehicle, even in a state where the vehicle is at rest and the ignition switch is off, the operation of the fuel cell system for generating electric power with the fuel cell is continued, with the result that in the meantime, it is desirable to detect a shock to the vehicle. Hence, a significant effect is achieved by providing the shock detection system of the above aspect in the fuel cell vehicle.

The present invention can be realized by various aspects such as a shock detection system with a vehicle at rest, a shock detection method with a vehicle at rest, a vehicle incorporating a shock detection system and a fuel cell vehicle including a shock detection system.

DESCRIPTION OF THE EMBODIMENTS

Figure 1:
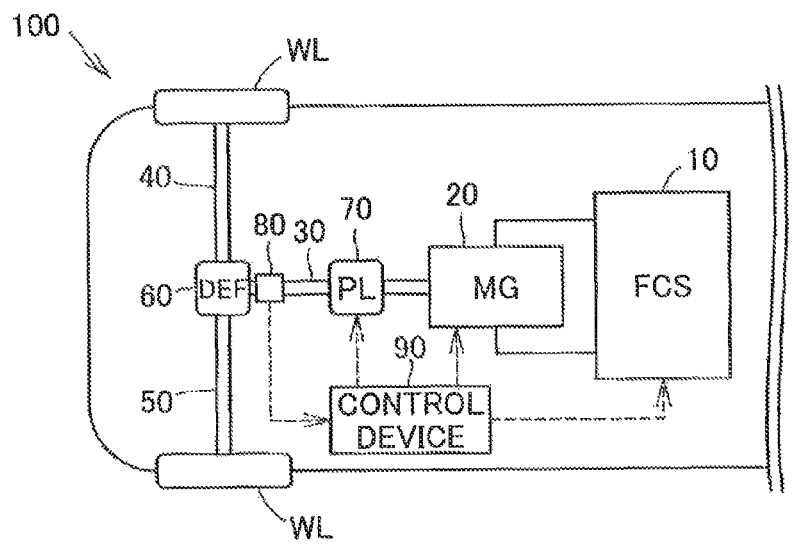
FIG. 1 is an illustrative diagram showing part of the configuration of a fuel cell vehicle in an embodiment of the present invention.

FIG. 1 is an illustrative diagram showing part of the configuration of a fuel cell vehicle 100 in an embodiment of the present invention. The fuel cell vehicle 100 uses, as energy, electric power generated by a fuel cell to drive a motor and travel. The fuel cell vehicle 100 includes a fuel cell system (FCS) 10, a motor (MG) 20 for driving wheels WL, drive shafts 30, 40 and 50 that rotate the wheels WL, a differential gear (DEF), a parking mechanism 70, a revolution sensor 80 and a control device 90.

The fuel cell system 10 includes a fuel cell, a reaction gas supply-discharge device and a coolant supply-discharge device that are not illustrated, and supplies the electric power generated by the fuel cell to a load such as the motor 20. The motor 20 uses, as energy, the electric power supplied from the fuel cell system 10 to produce a drive force (rotating force) corresponding to an amount of pressing of an acceleration pedal (unillustrated) operated by a driver, transmits the drive force through the first drive shaft 30, the differential gear 60, the second drive shaft 40 and the third drive shaft 50 to the wheels WL on the left and right sides and thereby rotates the wheels WL on the left and right sides.

The first drive shaft 30 is provided with the parking mechanism 70 for locking the rotation of the drive shaft 30 and the revolution sensor 80 for detecting the revolution speed of the drive shaft 30. The parking mechanism 70 is a mechanism that locks the rotation of the first drive shaft 30 when an unillustrated. shift lever is placed in a parking range, and is also called a "packing lock mechanism" or a "vehicle movement lock mechanism". The parking mechanism is provided not only in the fuel cell vehicle of the present embodiment but also normally provided in various vehicles incorporating a conventional general automatic transmission (AT), and is provided in the output portion of the AT. In the fuel cell vehicle 100 of FIG. 1, a reducer and a transmission that are not illustrated are also provided in the output mechanism of the motor 20, and the parking mechanism 70 is provided in the output mechanism. When, the rotation of the first drive shaft 30 is locked, the rotation of the second drive shaft 40 and the third drive shaft 50 is also locked. The revolution sensor 80 is a sensor for detecting the speed of the vehicle. As with the parking mechanism, the revolution sensor is normally provided in various conventional vehicles.

The control device 90 is configured as a computer that includes input-output ports connected to a CPU which executes a computer program, a ROM which stores the computer program and the like, a RAM which temporarily stores data, various types of sensors, an actuator and the like. The control device 90 controls the operations of the fuel cell system 10, the motor 20, the parking mechanism 70 and the like. As will be described below, the control device 90 operates as a shock detector that detects a shock to a vehicle with the vehicle at rest.

Figure 2:
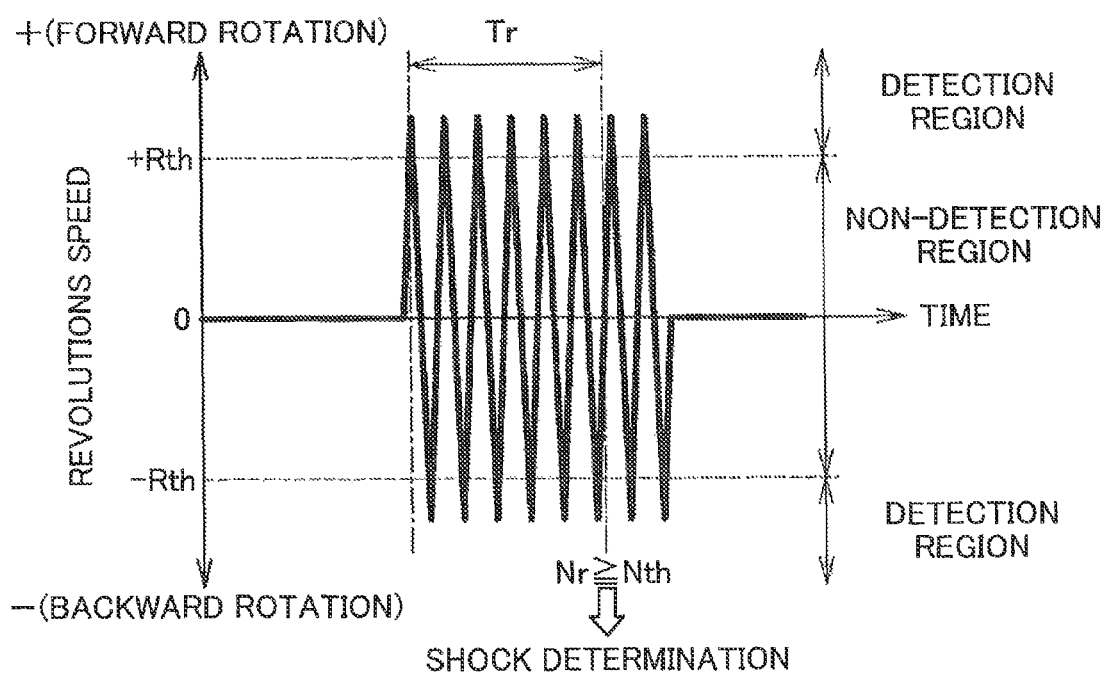
FIG. 2 is an illustrative diagram showing the revolution speed detected by a revolution sensor when a shock is applied to a vehicle.

FIG. 2 is an illustrative diagram showing the revolution speed detected by the revolution sensor 80 when a shock is applied to the vehicle with the vehicle at rest in FIG. 2, the horizontal axis represents time, and the positive (+) direction of the vertical axis represents the revolution speed in the direction in which the wheels WL are rotated forward and the negative (−) direction represents the revolution speed in the direction in which the wheels WL are rotated backward. Here, the "with the vehicle at rest" means a state where the drive shafts 30, 40 and 50 (FIG. 1) are locked by the parking mechanism 70. More preferably, the breaking of the wheels is not performed by a parking brake mechanism (unillustrated) in this state. This is because when the breaking of the wheels is performed by the parking brake mechanism, as will be described later, it is difficult for the revolution sensor 80 to detect oscillatory variations in the revolution speed.

In general, for example, the parking mechanism 70 has a structure for locking the rotation of a gear (unillustrated) interposed in the drive shaft by engaging a locking pin with a groove provided in the gear or a structure for locking the rotation by engaging a locking claw with the gear wheel of the gear, and the locking is performed with some play in the drive shaft. Hence, when some force is applied to the vehicle, the wheels WL are oscillated in the rotation directions by the force, thereby causing the rotation of the first drive shaft 30 oscillatorily varied. Consequently, the revolution speed becomes oscillatorily varied as shown in FIG. 2, although the revolution speed detected by the revolution sensor 80 is normally "zero" with the vehicle at rest. When the revolution speed detected by the revolution sensor 80 reaches a revolution-speed threshold value Rth or above, a relatively large shock may be applied to the vehicle. When a large shock is applied, as in the example of FIG. 2, the revolution speed equal to or more than the revolution-speed threshold value Rth occurs oscillatorily and repeatedly.

Hence, the control device 90 serving as the shock detector performs the detection of a shock in which it determines that a shock is applied if the revolution speed that is equal to or more than a revolution-speed threshold value Rth (such revolution speed will be hereinafter also referred to as a "fluctuated revolution 2.5 speed") occurs the number of times Nr that is equal to or more than a number-of-times threshold value Nth in a determination period Tr. The revolution-speed threshold value Rth is previously determined as the threshold value of the revolution speed which occurs due to a force (acceleration) having a magnitude that is desired to be detected as a shock. The determination period Tr is a given time that is a predetermined time elapsed since the time when the fluctuated revolution speed equal to or more than the revolution-speed threshold value Rth is first detected. The number-of-times threshold value Nth is previously determined as the threshold value of the number of times the fluctuated revolution speed equal to or more than the revolution-speed threshold value Rth occurs in the determination period Tr when a force that is desired to he detected as a shock is applied.

Since the revolution speed increases as the magnitude of a force applied to the vehicle increases, the detected revolution speed corresponds to the magnitude of the force applied to the vehicle. Hence, by setting the fluctuated revolution speed, as the target of the detection of a shock, to be equal to or more than the predetermined revolution-speed threshold value Rth, only sufficiently large forces having a magnitude that is desired to be detected will be detected as a shock. For example, it is possible to exclude, from the target of the detection, a force occurring accidentally or on a daily basis and whose magnitude is not enough large to be detected as a shock, such as small variations in the revolution speed occurring due to a force of wind.

As the magnitude of a force applied to the vehicle increases, there is a tendency that the interval between the peaks of oscillatory variations in the detected revolution speed decreases, and the time of the entire oscillation increases. By contrast, for the force whose magnitude is not enough large to he detected as a shock, the interval between the peaks of oscillatory variations in the revolution speed tends to increase, or the time of the entire oscillation tends to decrease even when the interval between the peaks of variations is short. Hence, if the number of times Nr of the fluctuated revolution speed during the determination period Tr, which is the predetermined time elapsed since the time when the fluctuated revolution speed equal to or more than the revolution-speed threshold value Rth is first detected, becomes equal to or more than the predetermined number-of-times threshold value Nth, it is judged that a shock to be detected was produced, and thus the occurence of a shock is detected. In this way, it is possible to exclude the oscillation of the fluctuated revolution speed equal to or more than the revolution-speed threshold value Rth occurring due to a force that occurs accidentally or on a daily basis and whose magnitude is not enough large to be detected as a shock, such as variations in the revolution speed occurring due to a force of wind, whereby such oscillation of the fluctuated revolution speed is prevented from being detected as a shock.

In the embodiment described above, it is possible to detect a shock to the vehicle by detecting variations in the revolution speed of the first drive shaft 30 in a state where the vehicle is at rest with the breaking being not performed on the wheels by the parking brake mechanism, and the drive shafts 30, 40 and 50 being locked by the parking mechanism 70. In the method of detecting a shock described above, without a sensor for detection of a shock with the vehicle at rest being newly provided, the constituent elements (the parking mechanism 70 and the revolution sensor 80) normally provided in a conventional vehicle are utilized, and thus it is possible to easily detect a shock in this way, as described in the discussion of the problem, while the system stop processing such as a scavenging operation is performed on the fuel cell in the fuel cell system 10 in a state where the vehicle is at rest and the ignition switch is off, it is possible to detect a shock to the vehicle, with the result that it is possible to take various measures according to the detection of a shock.

Incidentally, the system that includes the parking mechanism 70, the revolution sensor 80 and the control device 90 serving as the shock detector is also referred to as a "shock detection system".

Although the above embodiment describes that the revolution sensor 80 is provided so as to detect the revolution speed of the first drive shaft 30, there is no limitation on this configuration. The revolution sensor may he provided so as to detect the revolution speed of the second drive shaft 40 or the third drive shaft 50. When the revolution sensor is provided in each of the drive shafts of the four wheels including the other two unillustrated wheels, as described above, the detection of a shock may he performed on each of the revolution sensors.

In the embodiment described above, it is determined that a shock is applied if the revolution speed equal to or more than the revolution-speed threshold value Rth occurs the number of times Nr that is equal to or more than the number-of-times threshold value Nth in the determination period Tr. However, there is no limitation on this configuration, and for example, as described above, it may be determined that a shock is applied to the vehicle if the time interval between the first peak value and the subsequent peak value of the detection values of the revolution speed that are equal to or more than the revolution-speed threshold value Rth becomes equal to or less than a predetermined interval threshold value. As described above, as the magnitude of a force applied to the vehicle increases, the time interval between the peaks of oscillatory variations in the detected revolution speed tends to decrease. Therefore, in this way, it is possible to practically detect the occurrence frequency at which the revolution speed equal to or more than the revolution-speed threshold value Rth, with the result that it is possible to determine whether or not a shock to be detected is applied. In other words, the control device 90 serving as the shock detector is able to determine whether or riot a shock is applied to the vehicle based on the occurrence frequency at which the revolution speed of the drive shaft becomes equal to or more than the predetermined revolution-speed threshold value Rth, and also able to detect a shock to the vehicle based on the magnitude and the frequency of variations in the detection values of the revolution speed of the drive shaft detected by the revolution sensor.

Although the above embodiment describes the fuel cell vehicle, there is no limitation on this configuration, and the present invention may be applied to various vehicles such as general vehicles including various engines, vehicles including motors and hybrid vehicles including engines and motors. In the embodiment described above, functions and part or the whole of processing realized by software may be realized by hardware. Functions and part or the whole of processing realized by hardware may be realized by software. As the hardware, for example, various types of circuits (circuitry) such as an integrated circuit, a discrete circuit and a circuit module obtained by combining these circuits can be used.

The present invention is not limited to the embodiment described above, and can be realized by various types of configurations without departing from the spirit thereof. For example, the technological features of the embodiment corresponding to the technical features in the aspects described in the summary of the invention can be replaced or combined as necessary so that part or the whole of the problem described above is solved or part or the whole of the effects described above is achieved. When the technological features are not described as mandatory features in the present specification, it is possible to delete them as necessary.

What is claimed is:

1. A shock detection system with a vehicle at rest, comprising:
   a parking mechanism for locking rotation of a drive shaft which rotates a wheel of the vehicle;
   a revolution sensor for detecting a revolution speed of the drive shaft; and
   a shock detector for detecting a shock to the vehicle based on a magnitude and a frequency of variation in detection values of the revolution speed of the drive shaft detected by the revolution sensor in a state where the rotation of the drive shaft is locked by the parking mechanism.

2. The shock detection system according to claim 1, wherein the shock detector determines whether or not a shock is applied to the vehicle based on a occurrence frequency at which the revolution speed of the drive shaft becomes equal. to or more than a predetermined revolution-speed threshold value.

3. The shock detection system according to claim 1, wherein the shock detector determines that a shock is applied to the vehicle if a detection value of the revolution speed of the drive shaft equal to or more than the predetermined revolution-speed threshold value is obtained, a number of times equal to or more than a predetermined number-of-times threshold value within a predetermined time.

4. The shock detection system according to claim 2, wherein the shock detector determines that a shock is applied to the vehicle if a time interval between a first peak value and a subsequent peak value of the detection values of the revolution speed of the drive shaft that are equal to or more than the predetermined revolution-speed threshold value becomes equal to or less than a predetermined interval threshold value.

5. The shock detection system according to claim 1, wherein the vehicle is a fuel cell vehicle that uses, as energy, electric power generated by a fuel cell to drive a motor and travel.

6. A shock detection method with a vehicle at rest, comprising the steps of:
   (a) detecting a revolution speed of the drive shaft by a revolution sensor in a state where a parking mechanism for locking rotation of a drive shaft which rotates a wheel of the vehicle is used to lock the rotation of the drive shaft; and
   (b) detecting a shock to the vehicle based on a magnitude and a frequency of variation in detection values of the revolution speed of the drive shaft detected.

7. The shock detection method according to claim 6, wherein in the step (b), whether or not a shock is applied to the vehicle is determined based on a occurrence frequency at which the revolution speed of the drive shaft becomes equal to or more than a predetermined revolution-speed threshold value.

8. The shock detection method according to claim 7, wherein in the step (b), it is determined that a shock is applied to the vehicle if a detection value of the revolution speed of the drive shaft equal to or more than the predetermined revolution-speed threshold value is obtained a number of times equal to or more than a predetermined number-of-times threshold value within a predetermined time.

9. The shock detection method according to claim 7, wherein in the step (b), it is determined that a shock is applied to the vehicle if a time interval between a first peak value and a subsequent peak value of the detection values of the revolution speed of the drive shaft that are equal to or more than the predetermined revolution-speed threshold value becomes equal to or less than a predetermined interval threshold value.

10. The shock detection method according to claim 6, wherein the vehicle is a fuel cell vehicle that uses, as energy, electric power generated by a fuel cell to drive a motor and travel.

* * * * *